United States Patent
Daigle et al.

[11] Patent Number: 5,940,123
[45] Date of Patent: Aug. 17, 1999

[54] HIGH RESOLUTION ULTRASONIC IMAGING THROUGH INTERPOLATION OF RECEIVED SCANLINE DATA

[75] Inventors: Ronald E. Daigle, Redmond; Brent Stephen Robinson, Kirkland; Clifford R. Cooley, Seattle, all of Wash.

[73] Assignee: ATL Ultrasound, Bothell, Wash.

[21] Appl. No.: 08/800,005

[22] Filed: Feb. 13, 1997

[51] Int. Cl.$^6$ .................................................. H04N 5/31
[52] U.S. Cl. .......................... 348/163; 600/447; 600/445
[58] Field of Search .............................. 343/163; 600/443, 600/445, 447, 444; 73/625, 626, 861.25; 367/62; H04N 5/31

[56] References Cited

U.S. PATENT DOCUMENTS

| | | | |
|---|---|---|---|
| 4,549,210 | 10/1985 | Dulapa | 358/112 |
| 4,581,636 | 4/1986 | Blaker et al. | 358/112 |
| 4,930,514 | 6/1990 | Baba et al. | 128/661.09 |
| 5,315,512 | 5/1994 | Roth | 600/442 |
| 5,318,033 | 6/1994 | Savord | 128/661.01 |
| 5,345,426 | 9/1994 | Kipschutz | 367/103 |
| 5,390,674 | 2/1995 | Robinson et al. | 128/660.07 |
| 5,544,655 | 8/1996 | Daigle | 128/661.01 |
| 5,555,534 | 9/1996 | Maslak et al. | 367/135 |
| 5,581,517 | 12/1996 | Gee et al. | 367/138 |
| 5,623,928 | 4/1997 | Wright et al. | 600/447 |
| 5,827,189 | 10/1998 | Mo et al. | 600/454 |

FOREIGN PATENT DOCUMENTS

WO 96/03921  2/1996  WIPO.

OTHER PUBLICATIONS

"An Ultrasonic Annular Array Based on Quadrature Sampling", by Jeffry Earl Powers, Jun. 1980 (Ph.D. thesis), pp. 80–92.

Primary Examiner—Tommy P. Chin
Assistant Examiner—Gims S. Philippe
Attorney, Agent, or Firm—W. Brinton Yorks, Jr.

[57] ABSTRACT

A method and apparatus are provided for interpolating image lines from ultrasonically obtained scanlines of an image region. The interpolated lines are preferably formed one-quarter and three-quarters of the distance between each pair of received scanlines by combining weighted samples of the adjacent scanlines in proportion to their distances from the interpolated lines. The received scanlines are preferably formed by a beamformer which samples the received lines at quadrature phases of the scanhead center frequency and filters the samples by combining successive samples of a related phase. The image lines are scan converted by computing a grid of weighted values between each pair of image lines, and using the closest value for each pixel in the ultrasound image.

19 Claims, 9 Drawing Sheets

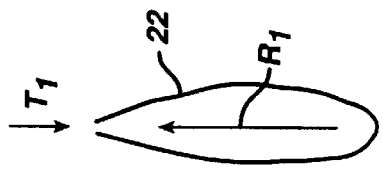
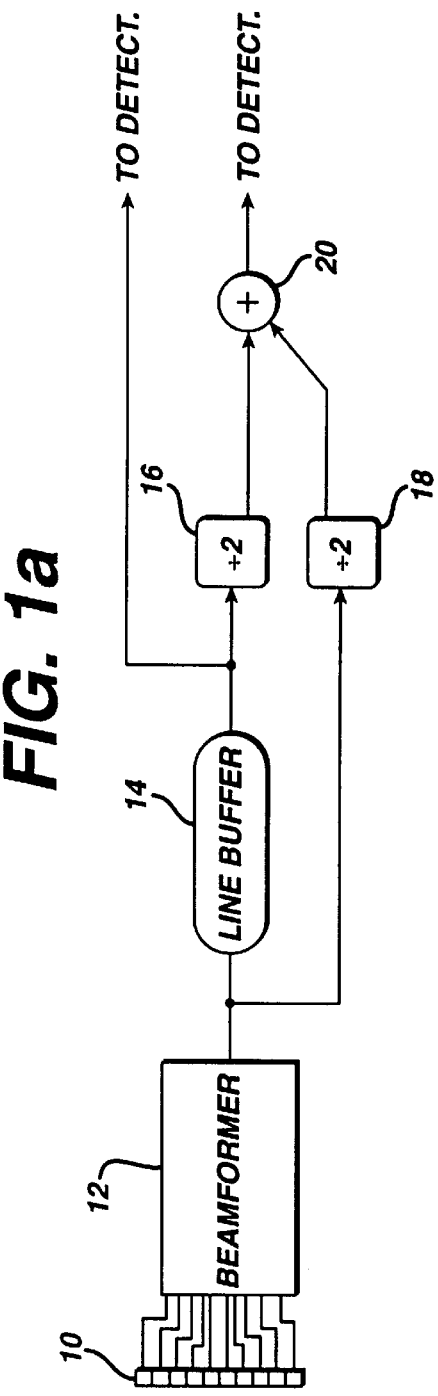
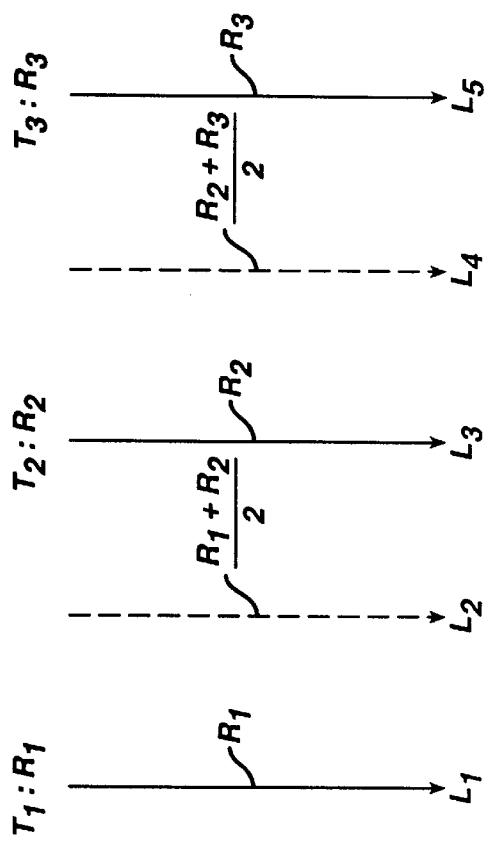

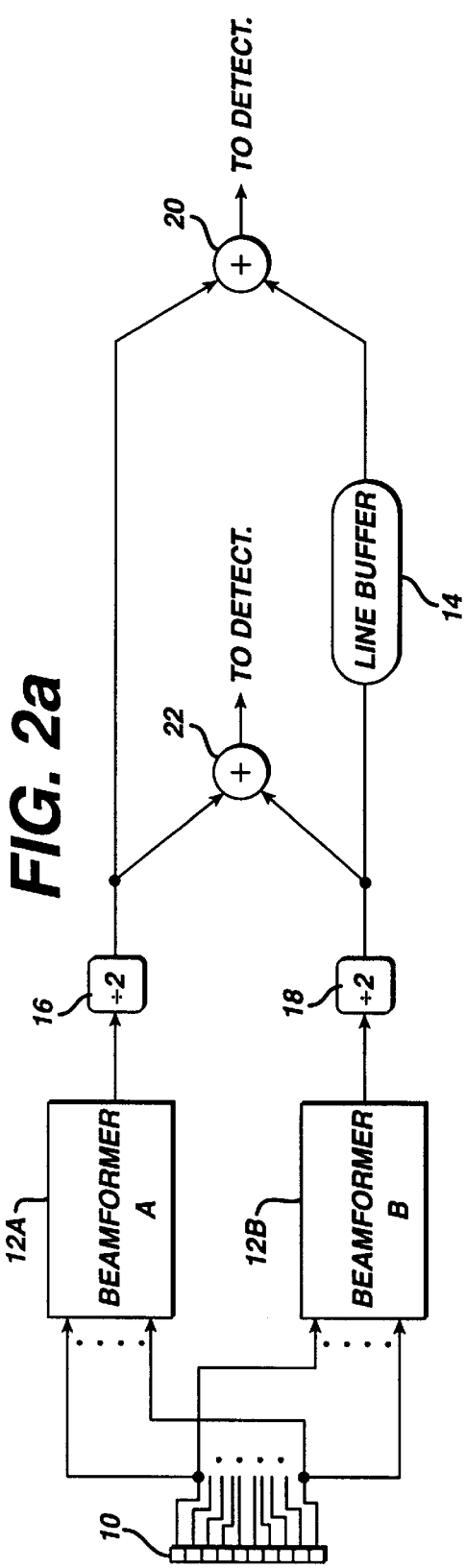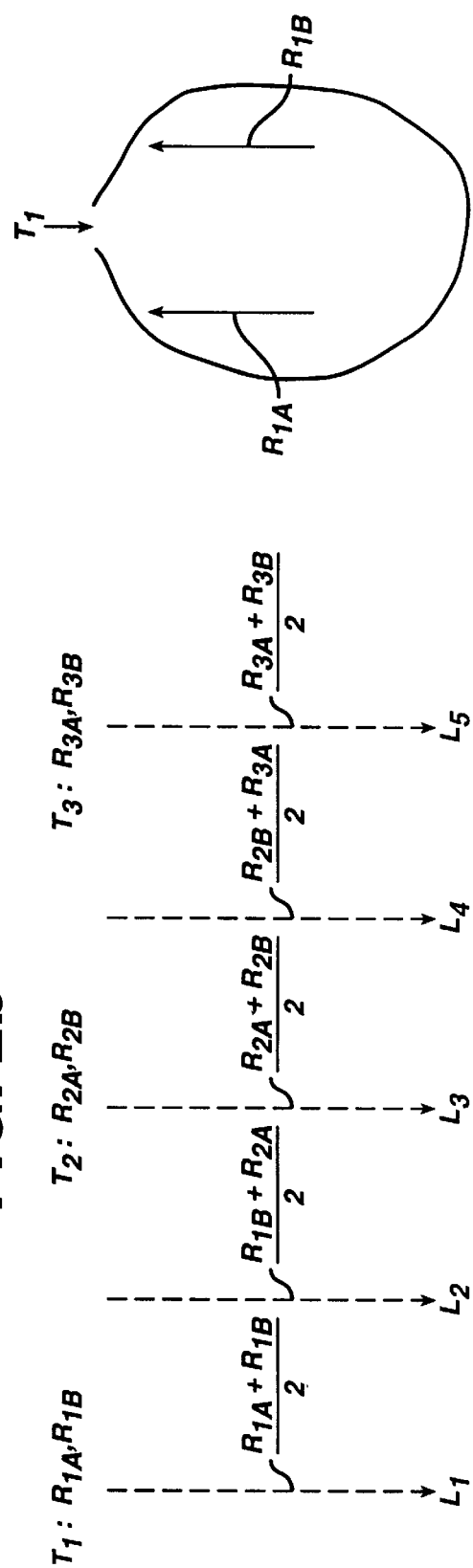

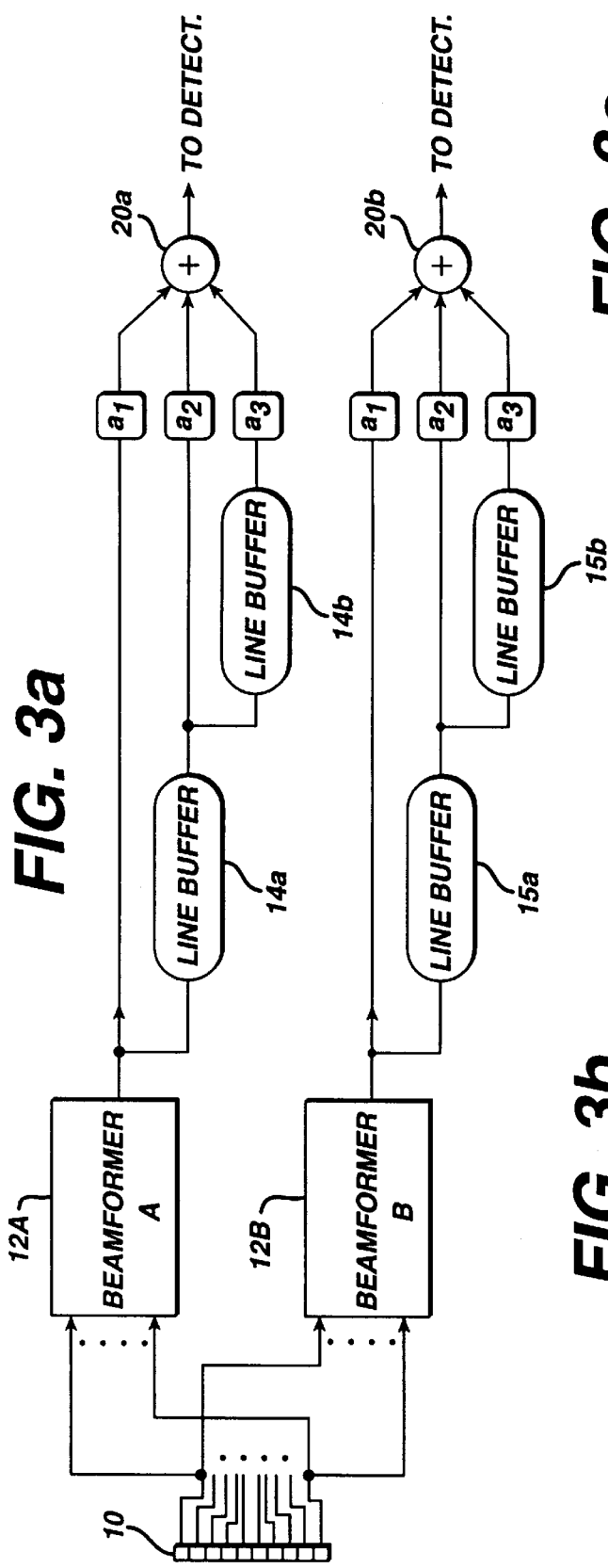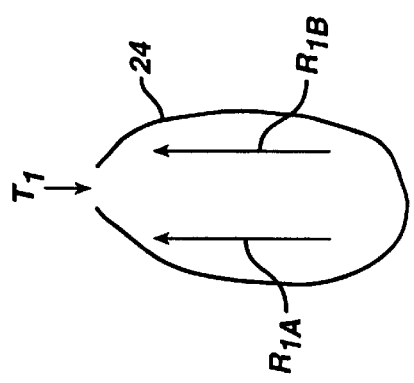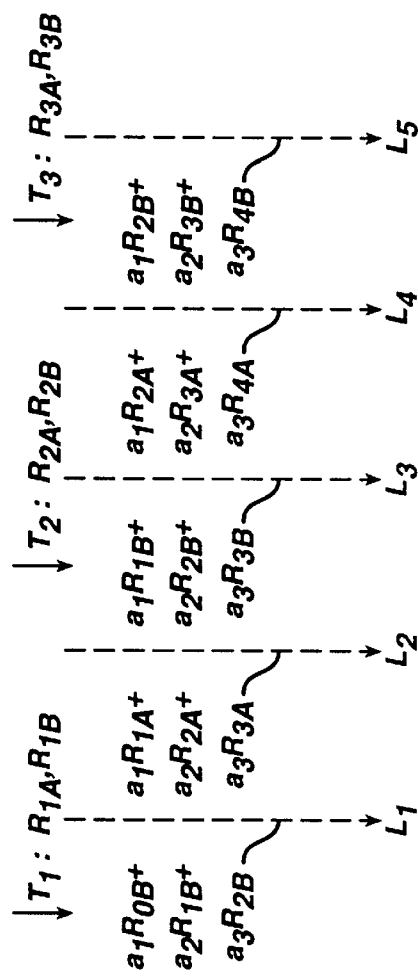

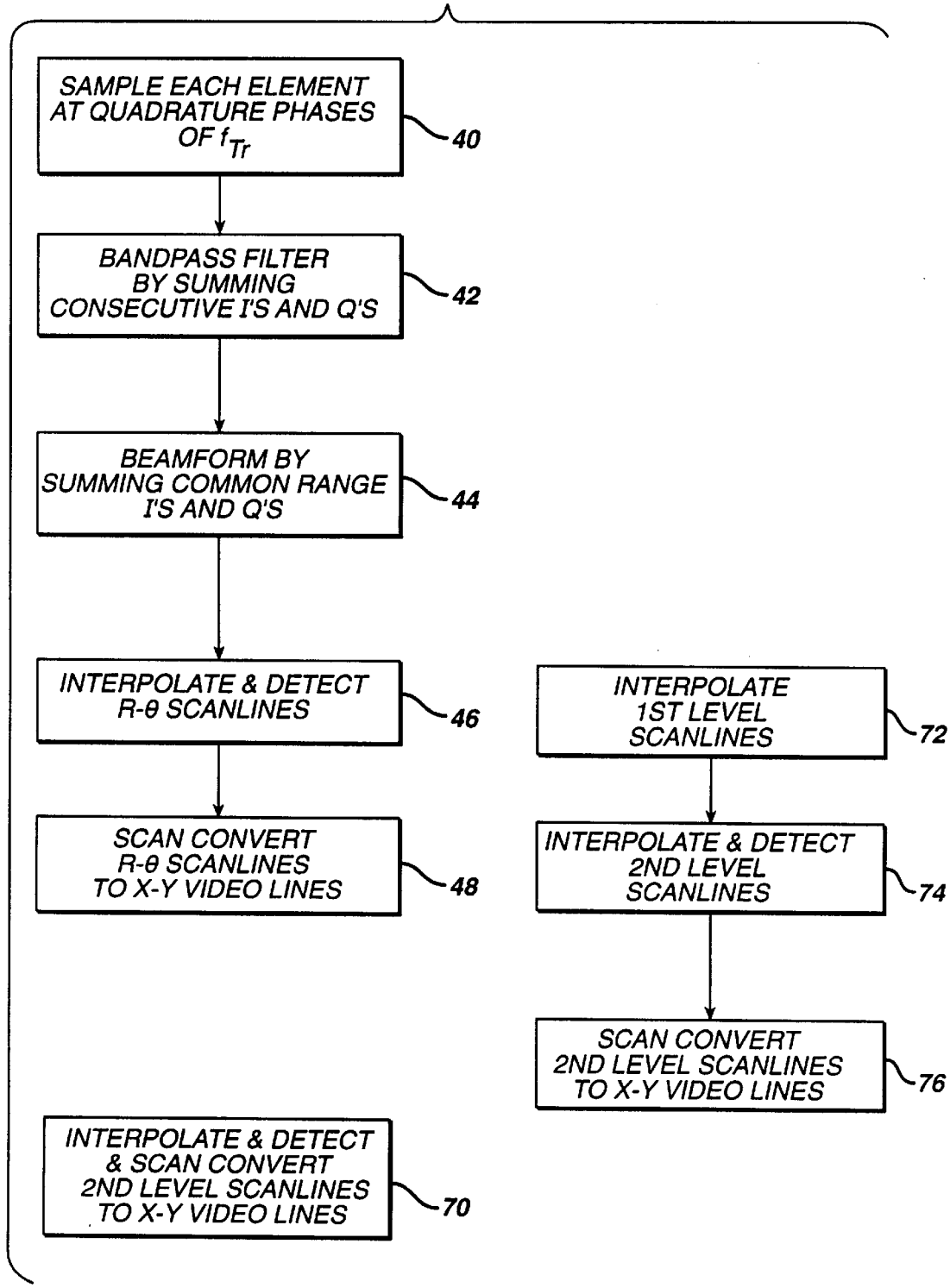

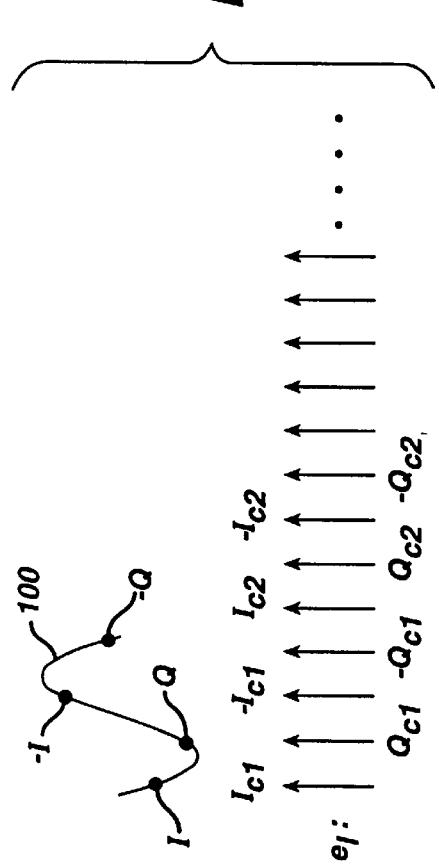
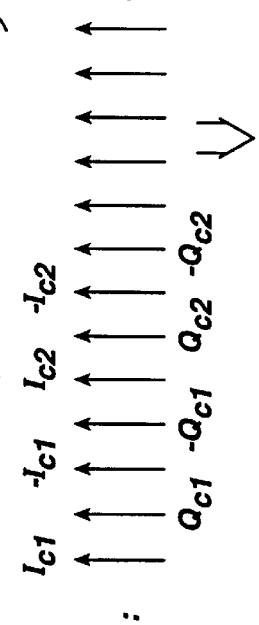
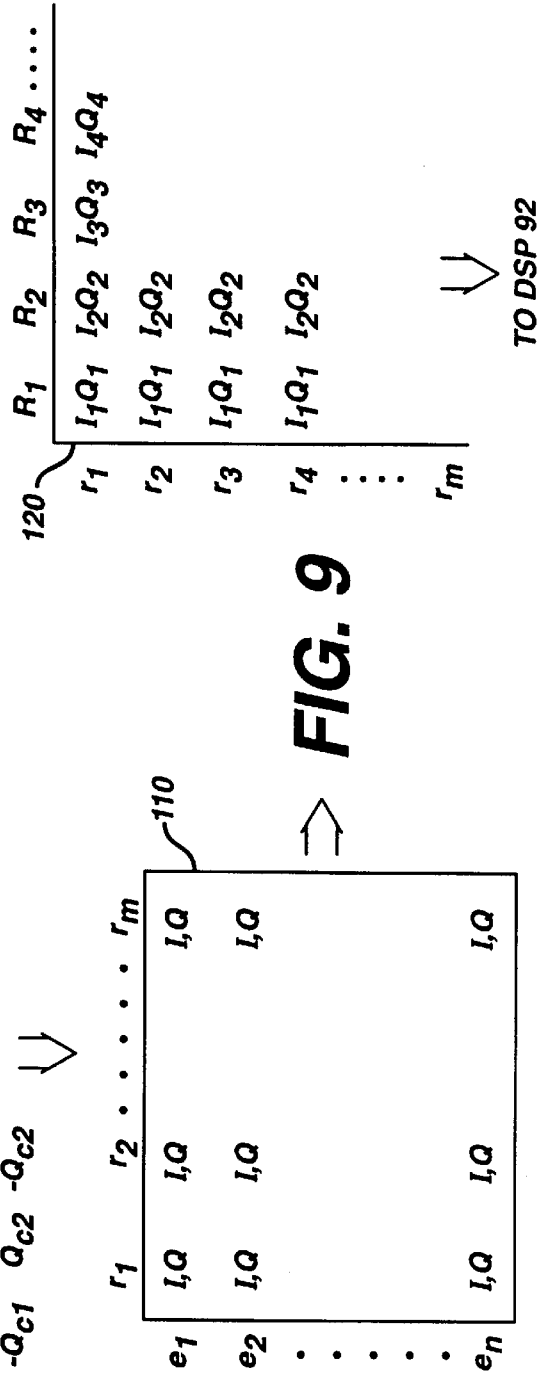
FIG. 7a
FIG. 7b
FIG. 8
FIG. 9

FROM DSP 92

|   | $L_1$ | $L_2$ | $L_3$ | $L_4$ | · · · · |
|---|---|---|---|---|---|
| $r_1$ | $E_{r1}$ | $E_{r1}$ | $E_{r1}$ | $E_{r1}$ | |
| $r_2$ | $E_{r2}$ | ⋮ | ⋮ | ⋮ | |
| $r_3$ | $E_{r3}$ | | | | |
| $r_4$ | $E_{r4}$ | | | | |
| ⋮ | ⋮ | | | | |
| $r_m$ | $E_{rm}$ | | | | |

130

HIGH RESOLUTION ULTRASONIC IMAGING THROUGH INTERPOLATION OF RECEIVED SCANLINE DATA

This invention relates to improvements in the resolution of ultrasonic diagnostic images and, in particular, to the development of high resolution ultrasonic images through the interpolation of received scanline data.

Designers of ultrasonic diagnostic imaging systems are constantly striving to have their products produce real time images of the highest diagnostic quality. The desire for real time images is satisfied by producing a sequence of new images at a high frame rate, the rate at which new images are received, processed and successively displayed on the image monitor. The desire for high diagnostic quality is satisfied by producing images which exhibit highly resolved structural detail in images with high line density. The demands for high frame rate and high line density are in inherent conflict, however. The greater the number of scanned image lines in an image, the longer the time required to scan an object and produce a complete image, and the slower the frame rate. Reducing the number of scanned lines will increase the frame rate, but at the expense of decreased line density in the image and hence decreased spatial sampling of structures in the image.

An approach to overcoming this seemingly inherent conflict is to generate additional image lines through the interpolation of new scanlines between received lines, as described in U.S. Pat. No. 5,390,674 (Robinson et al.) The time required to transmit an ultrasonic wave into the body and receive echoes from along a scanline is constrained by the laws of physics, that is, the speed of sound in the body. The time required to interpolate a scanline is not so constrained, but is a function of the speed and sophistication of processing hardware and software, both of which are, to a considerable degree, within the control of the system designer. Thus, for instance, the spatial sampling and line density of an image can be doubled by interpolating a new scanline between each pair of received scanlines, as described in the Robinson et al. patent, without doubling the time required to form a complete image. Image resolution is improved, but not at the one-for-one tradeoff of frame rate which the transmission of additional scanlines would entail.

A number of approaches to interpolation of scanlines for ultrasonic imaging have been proposed, with varying degrees of satisfaction. Several approaches, discussed below, propose scanline interpolation of the data of multiline beamformers, which are expensive and complex. Multiline scanning often employs a relatively wide transmit beam, which deleteriously affects the signal to noise ratio and image quality. Several of these approaches also produce image data with uneven processing effects, which introduces artifacts into the displayed image. Accordingly, it would be desirable to produce ultrasonic images with interpolated scanlines without the cost, complexity, and image quality compromises of such approaches.

In accordance with the principles of the present invention, a higher line density is provided for an ultrasonic image by interpolating between two spatially distinct received lines which have been produced by a beamformer to develop two interpolated lines which are at line locations offset from the locations of the received lines. Such interpolation doubles the line density of an ultrasonic image as compared to use of the received lines alone (or can double the frame rate at an equivalent line density) without the need for costly multiple or multiline beamformers. A preferred embodiment of the present invention uses a quadrature sampling digital beamformer in which bandpass filtering is provided through the combination of quadrature samples. By using successive transmissions for the received lines, each line can be transmitted and received with a tight beam focus. By generating an image with scanlines interpolated with coefficients exhibiting matched power spectra, the artifact created by use of unevenly processed lines is avoided.

In the drawings:

FIGS. 1a–1c, 2a–2c, and 3a–3c illustrate previously proposed interpolation schemes for increasing scanline density;

FIG. 6 is a flowchart explaining the operation of the software of the ultrasonic imaging system of FIG. 5;

Figure 12:
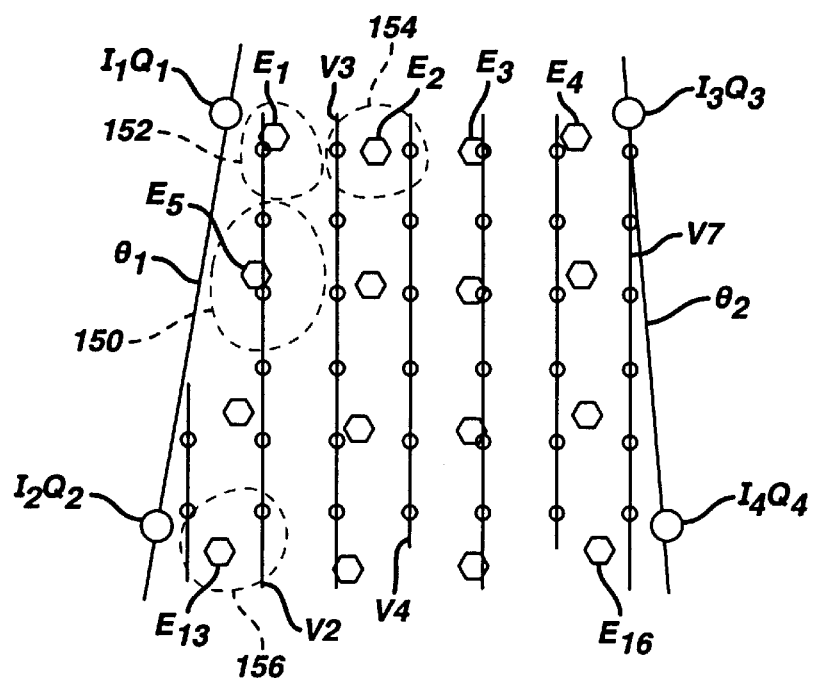
Figure 11:
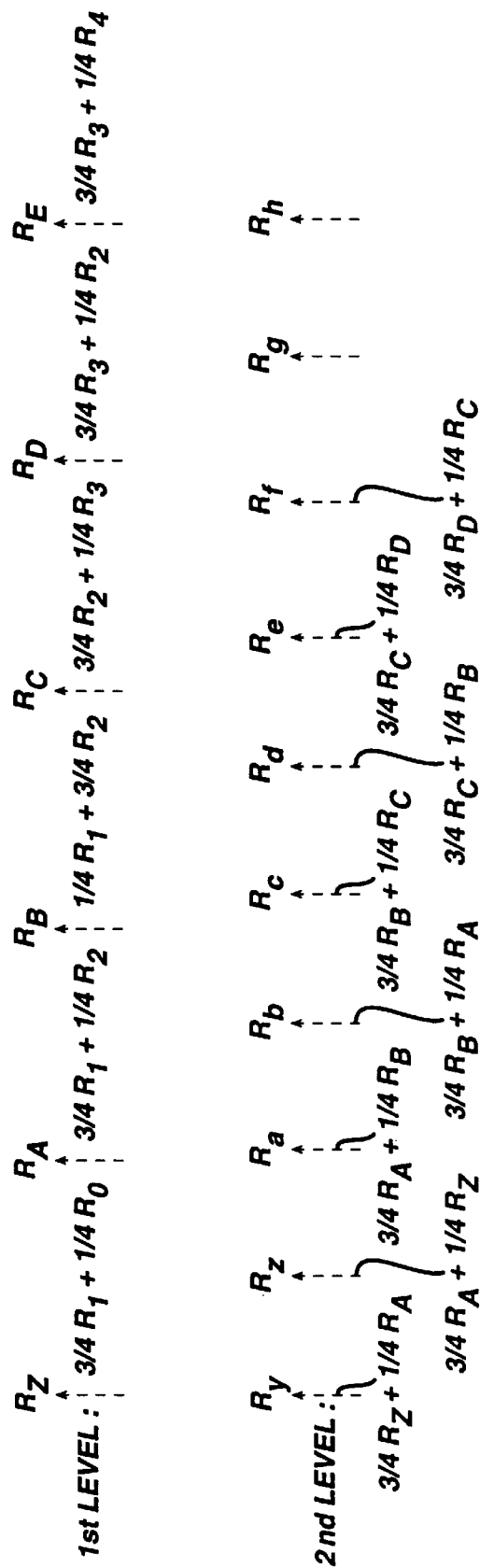

FIGS. 7a and 7b, 8, 9, and 10 is a sequence of drawings explaining the beamforming and scanline interpolation techniques of the present invention in conjunction with the flowchart of FIG. 6;

FIG. 11 depicts multiple level scanline interpolation in accordance with the principles of the present invention; and FIG. 12 illustrates combined scanline interpolation and scan conversion.

Referring first to FIGS. 1a–1c, the scanline interpolation technique of the aforementioned Robinson et al. patent is depicted in several ways. FIG. 1a is a block diagram schematic which shows a multielement array transducer 10 coupled to a beamformer 12. The beamformer 12 causes the transducer array to sequentially transmit beams of ultrasonic waves along the direction of spatially distinct beams, and appropriately delays and sums the signals received by the transducer array in response to each beam transmission. Each received scanline, the sequence of echoes received along each beam direction in response to a transmitted ultrasound beam, is applied to a line buffer 14 and a divide-by-two circuit 18. The output of the line buffer 14 is coupled to a second divide-by-two circuit 16. The line buffer 14 delays the applied received scanline by the time required to transmit and receive a scanline, including any waiting period between beams. Thus, a delayed scanline is produced at the output of the line buffer 14 and coupled to divide-by-two circuit 16 at the same time that the next received scanline is applied to the input of the line buffer 14 and to the other divide-by-two circuit 18. Values of the two scanline signals from each corresponding beam depth are divided by two and applied to a summing circuit 20, which produces a new scanline that is interpolated from the two sequential scanlines. The interpolated scanline and the first received scanline are thereafter detected, scan converted and displayed as display lines of an image.

The manner in which display lines are produced is depicted by the image lines of FIG. 1b. One line of an image, line $L_1$, is comprised of a first received scanline, $R_1$. The next received scanline, $R_2$, forms the third image line, $L_3$. The successive scanlines $R_1$ and $R_2$ are divided by two and summed as shown by the expression $(R_1+R_2)/2$ to produce an interpolated line which is displayed as intermediate image line $L_2$. After the next scanline $R_3$ is received, this scanline and the preceding scanline $R_2$ are used to interpolate a line of the form $(R_2+R_3)/2$ which is displayed as image line $L_4$. It may be seen that this technique will produce image lines for display which are almost twice the number of received scanlines, the number of interpolated beams being only one less than the number of received scanlines.

Since only one beam is transmitted and received at a time, the transmitted beam can be tightly focused along the spatial location of the received scanline, as indicated by the transmit beam pattern 22 in FIG. 1c. The received scanline is focused to the same single spatial line characteristic. Since the focal characteristic of a received scanline is a function of both the transmit and receive beam patterns, the resultant beam is tightly focused due to the use of the same tight single beam focus during both transmission and reception.

FIGS. 2a–2c depict a second interpolation technique, that suggested by U.S. patent application Ser. No. 08/286,510 (Wright et al.). This patent application shows the Robinson et al. interpolation technique in its FIG. 2. The preferred embodiment of Wright et al., shown in FIG. 1A of the patent application, is to receive multiple scanlines simultaneously at a half of the transmitted beam interval spacing on each side of each transmitted beam (multiline reception), then to interpolate a scanline at the half line interval from successive received scanlines. The multiple scanlines received from each reception are also used to interpolate a scanline at the location of the transmitted beam. A further set of intermediate interpolated lines is then computed as taught by Robinson et al.

The transmission, reception, and interpolation scheme of Wright et al. is depicted in FIGS. 2a and 2b. Transmitted beams $T_1$, $T_2$, and $T_3$ are successively transmitted at image line locations $L_1$, $L_3$, and $L_5$ as shown in FIG. 2b. A multiline beamformer, represented by beamformer A and beamformer B in FIG. 2a, is used to receive two scanlines, one on each side of the location of the transmitted beam. For instance, transmitted beam $T_2$ results in reception of received scanline $R_{2A}$ by beamformer A at location $L_2$, and received scanline $R_{2B}$ by beamformer B at location $L_4$.

Image lines $L_n$ are now interpolated at and between the transmitted beam locations. The image line $L_3$ at the location of transmitted beam $T_2$ is produced from the two multilines received in response to and on either side of that transmitted beam. Thus, image line $L_3$ is equal to $(R_{2A}+R_{2B})/2$, which is produced in FIG. 2a by divide-by-two circuits 16 and 18, followed by summing circuit 22. The image lines between the transmitted beam locations are produced from the received scanlines of successive transmissions. For example, image line $L_2$ is equal to $(R_{1B}+R_{2A})/2$, where $R_{1B}$ was received between $L_1$ and $L_3$ in response to transmitted beam $T_1$, and $R_{2A}$ was received between $L_1$ and $L_3$ in response to transmitted beam $T_2$. In FIG. 2a, this is produced by delaying the "B" scanline by one line interval with line buffer 14, then adding the delayed scanline with the next undelayed "A" scanline in summing circuit 20. Image lines $L_n$ are alternately generated in this manner across the image field.

The preferred embodiment of Wright et al. then goes on to use adjacent lines to interpolate an additional set of intermediate interpolated lines (not shown) as Robinson et al. teach. That is, the final image line set is comprised of a set of intermediate lines ($L_{1.5}$, $L_{2.5}$, $L_{3.5}$, etc.) which are derived from and displayed between a set of previously generated lines ($L_1$, $L_2$, $L_3$, etc.) Wright et al.'s preferred technique is to use a four tap FIR filter to interpolate these intermediate lines. Thus, the interpolated line at line position $L_{2.5}$ is interpolated from surrounding lines $L_1$, $L_2$, $L_3$, and $L_4$.

The Wright et al. technique, while affording a doubling of the initial set of received scanlines in comparison to the transmitted scanlines, does so at the expense of a multiline beamformer, which vastly increases beamformer complexity and cost. The transmitted beam $T_n$ must be broad enough to insonify the two received scanline locations $R_{nA}$ and $R_{nB}$ which are a half of the transmitted line spacing on either side of the transmitted line location, as shown in FIG. 2c. But irrespective of the breadth of the transmitted beam, the first set of interpolated lines, lines $L_1$, $L_2$, $L_3$, etc., alternately consist of those formed with a common transmit beam and interpolation of receive beams (lines $L_1$, $L_3$, etc.), and those formed with a common receive beam and interpolation of transmit beams (lines $L_2$, $L_4$, etc.) Unless the transmit and receive beams have identical characteristics (which is not the case when using fixed transmit focus and dynamic receive focus), or the interpolation filters are perfect (which finite length filters are not), then interpolation artifacts will be different on alternate lines. Wright et al. try to compensate for this problem through subsequent use of a 3-tap azimuthal filter with tap weights of (¼, ½, ¼). While this smoothing filter will diminish the interpolation artifact, it does so at the cost of blurring the image through what amounts to low pass filtering in the azimuthal direction.

An improvement over the Wright et al. technique is that shown in FIG. 21 of U.S. Pat. No. 5,318,033 (Savord) and depicted in FIGS. 3a–3c. Savord recognizes that it is not necessary to constrain the image line locations to alignment with the transmitted line locations, as Wright et al. do. Freed from this constraint, Savord produces multilines offset from the transmitted line locations by one-quarter of the transmitted line spacing, thereby bringing the received beams closer to the center of the transmitted beam. But like Wright et al., Savord also requires multiple beamformers for multiline reception, as well as an interpolation scheme.

FIG. 3b depicts the effect of the Savord processing scheme shown in FIG. 3a. A transmitted beam along line $T_2$ results in received scanlines $R_{2A}$ and $R_{2B}$ being received at a one-quarter line spacing on either side of the transmitted beam location. The received scanlines $R_{2A}$ and $R_{2B}$ are produced by beamformers A and B in FIG. 3a. Three successive $R_{nA}$ scanlines are used in a three tap FIR filter, formed by line buffers 14a and 14b, weighting circuits $a_1$, $a_2$, and $a_3$, and summing circuit 20a, to produce interpolated lines at the $R_{nA}$ scanline locations. Similarly, an FIR filter comprised of line buffers 15a and 15b, weighting circuits $a_1$, $a_2$, and $a_3$, and summing circuit 20b are used to interpolate successive $R_{nB}$ received scanlines to produce interpolated lines at the $R_{nB}$ scanline locations. It is seen in FIG. 3b that no lines are produced at the locations of the transmit beams $T_1$, $T_2$, $T_3$, etc. As FIG. 3c shows, Savord's transmit beam needs to insonify the locations of the received scanlines $R_{nA}$ and $R_{nB}$, which are offset from the location of the transmit beam $T_n$ by only a quarter of the transmit beam spacing. The received scanline density is twice that of the transmit beam density but, like Wright et al., this is at the expense of multiple beamformers and azimuthal filtering. Savord does not double the line density again through a second interpolation of intermediate lines as do Wright et al., although such a further step could obviously be employed by Savord if desired.

Figure 4A:
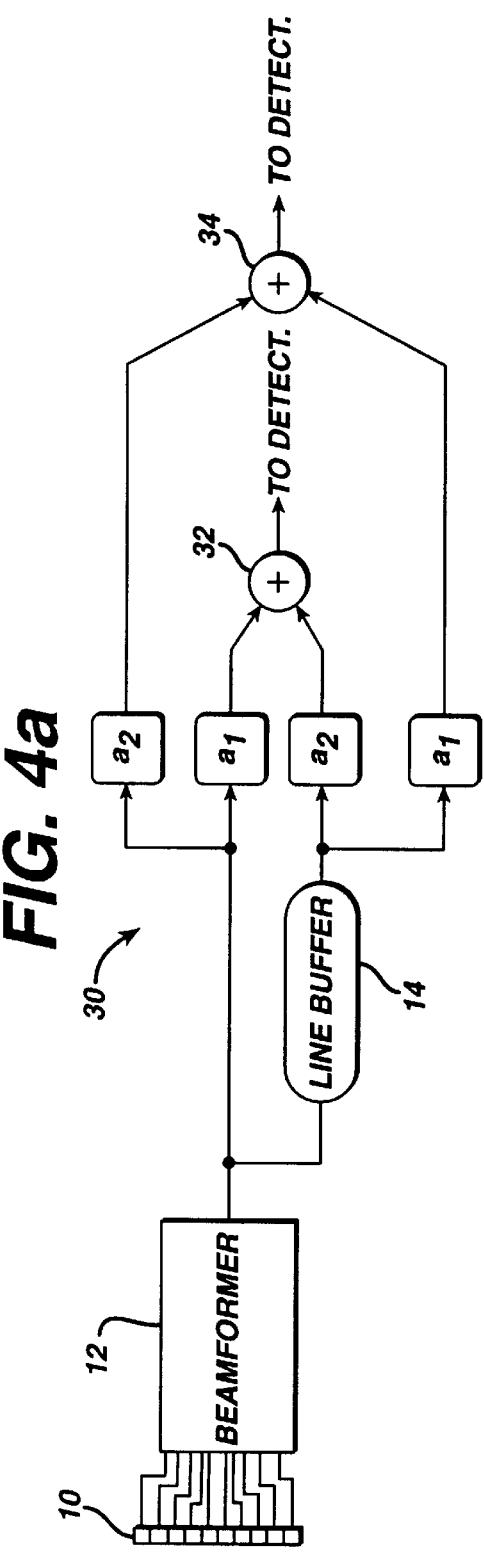
FIGS. 4a–4c illustrate an interpolation technique of the present invention.
Figure 4C:
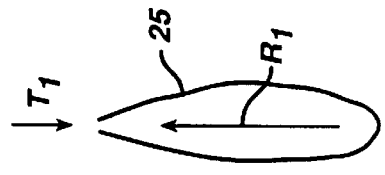
Figure 4B:
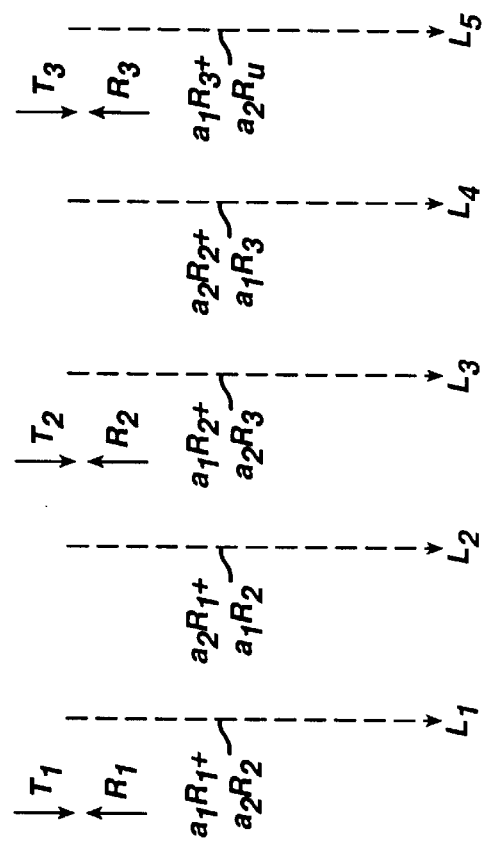

FIGS. 4a–4c depict an embodiment of an interpolation technique of the present invention, drawn in the same notation as the preceding drawings. Like Robinson et al., the embodiment of FIG. 4a only requires a single beamformer, avoiding the additional cost and expense of the multiline beamformers of Wright et al. and Savord. As shown by transmit arrows $T_1$, $T_2$, and $T_3$ and receive arrows $R_1$, $R_2$, and $R_3$, each received scanline is received at the same location as that of its transmitted beam. This is depicted by the tightly focused beam pattern 25 in FIG. 4c, where it is seen that the transmitted and received beams can utilize highly focused and aligned beam patterns.

Successive received scanlines are then used to produce two interpolated image lines at separate locations between the received scanline locations. This is accomplished in FIG. 4a by interpolator 30. A line buffer 14 delays each received scanline by one line period. The delayed line and the currently received line are then weighted by weighting factors $a_1$ and $a_2$ and the weighted scanline signals are then combined by a summing circuit 32, 34. The interpolated signals are then detected, arranged in the desired image format by a scan converter, and displayed.

FIG. 4b depicts the result of this interpolation technique when two lines are interpolated, it being understood that the technique can interpolate more than two image lines between each pair of received scanlines. The two transmitted beams $T_1$ and $T_2$ result in the reception of two received scanlines, $R_1$ and $R_2$. Image lines $L_1$ and $L_2$ are produced at one-quarter line offset positions from the nearest received scanline locations. The image lines $L_1$ and $L_2$ are thus separated by one-half of the transmit and receive line spacing. To produce these two lines the weighting factor $a_1$ is set at a weight of ¾ and the weighting factor $a_2$ is set at a weight of ¼. Image line $L_1$ is produced at the output of summing circuit 34 and is equal to (¾$R_1$+¼$R_2$), thus weighting the contributions of the received scanlines to the interpolated image line in accordance with the proximity of the received scanlines to the location of the interpolated image line. In a similar manner summing circuit 32 produces interpolated image line $L_2$, which is equal to (¼$R_1$+¾$R_2$). It is seen that no image lines are produced at the locations of the transmitted or received scanlines, and that the interpolation technique doubles the line density without resorting to a multiline beamformer or the need for a broadened transmit beam pattern. The interpolated image lines are subsequently detected, processed, and displayed in an ultrasonic image.

The preferred embodiment, in which the line density is doubled through use of interpolation weights of ¼ and ¾, prevents occurrence of the varying line to line interpolation artifact of the prior art techniques. This is due to the matched power spectra of the two sets of interpolation coefficients used to produce the interpolated lines. The spectral matching results because the first interpolated line is calculated from the coefficients (¾, ¼) the second line from (¼, ¾), and the power spectrum of any set of filter coefficients is unchanged when the order of the coefficients is reversed.

Additionally, these coefficients form interpolated lines which are at position offsets T/4 and 3T/4, where T is the spacing between the received lines. As a result, all the interpolated lines are evenly spaced with spacing ½T.

The preferred implementation interpolates two image lines between each pair of received scanlines at line positions V1 and V2. Uniform spacing between interpolated lines requires that V2=V1+T/2, where T is the spacing between the received scanlines. Denote the power spectrum of a set of coefficients that interpolates to line position V as P(V,f), where f represents lateral spatial frequency. The power spectrum of the interpolation filter is invariant with respect to shifts of the interpolated line position that are integral multiples of the received scanline spacing so that P(V,f)=P(−V,f).

Therefore, in order to ensure that the power spectra of the pair of interpolation filters are matched it is sufficient to ensure that P(V2,f)=P(V2−T,f)=P(V1,f)=P(−V1,f). Apart from the trivial situation that V1=V2, this is satisfied when V2−T=−V1, or V2+V1=T. Thus, there are two simultaneous equations for the conditions of T/2 interpolated line spacing and matched power spectra, $V2-V1=T/2$, and $V2+V1=T$ The solution of these simultaneous equations is V1=T/4, and V2=3T/4. Thus, use of coefficients (weighting values) ¼ and ¾ for $a_1$ and $a_2$ will produce two interpolated lines of matched coefficient spectral responses and a uniform spacing of T/2 between lines.

More generally, any set of interpolation filter coefficients which produces lines at position offset T/4 can be reversed to produce lines at position offset 3T/4 (which can also be expressed as −T/4). The resulting interpolated lines are evenly spaced, and because the same coefficients are used (after reversing the order), power spectral matching is achieved.

By virtue of the matched spectral responses of the interpolation coefficients, the interpolated lines at the T/4 and 3T/4 position offsets will exhibit no varying interpolation artifact.

Figure 5:
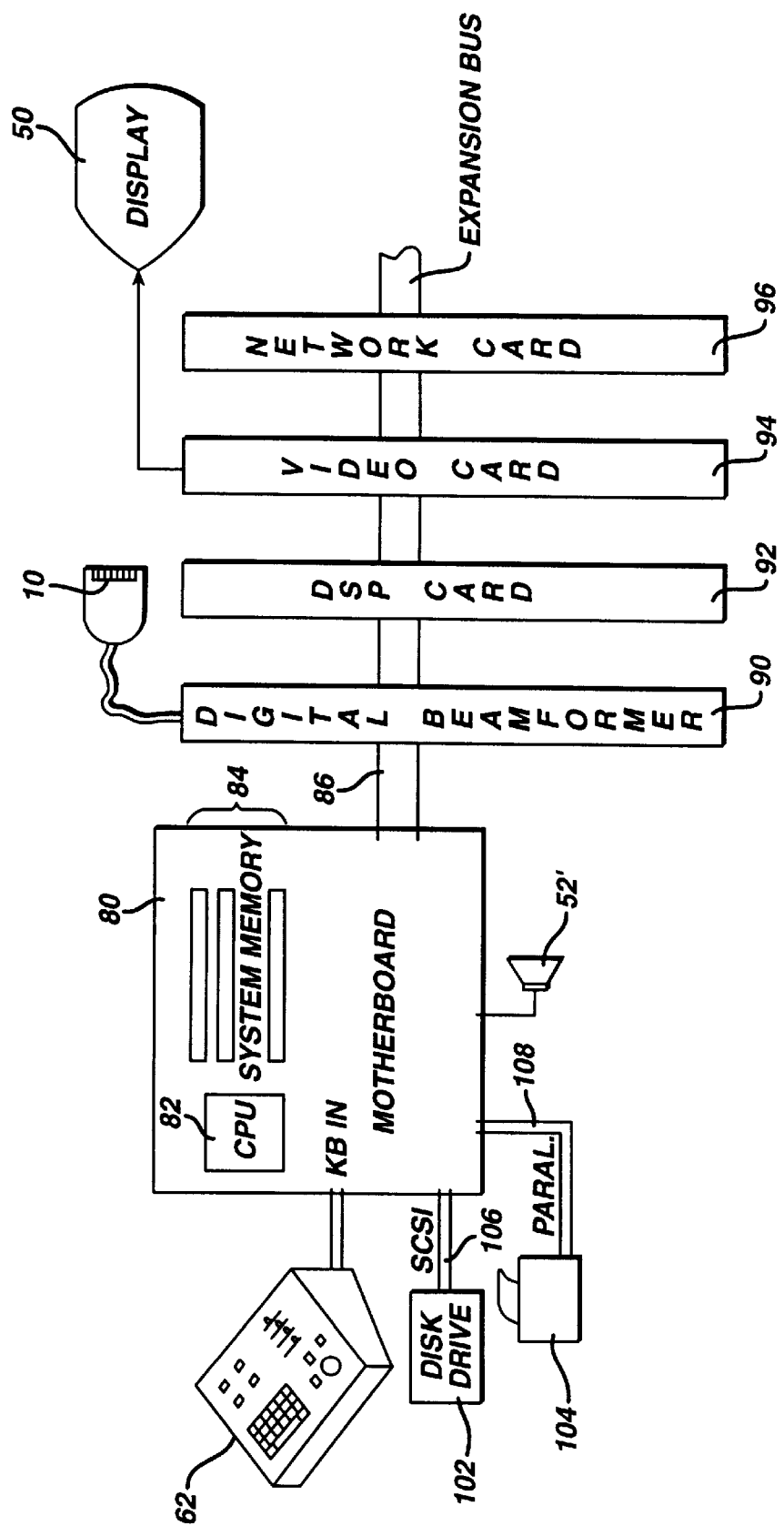
FIG. 5 illustrates an ultrasonic diagnostic imaging system constructed in accordance with the principles of the present invention.

FIG. 5 illustrates in block diagram form an ultrasonic diagnostic imaging system which is adapted to produce image lines in accordance with the interpolation technique of the present invention. The ultrasonic imaging system of FIG. 5 is more fully described in U.S. Pat. No. 5,795,297. As described therein, this system is a personal computer based ultrasound system with most functions being performed by software rather than dedicated hardware. A motherboard 80 contains a central processing unit (CPU) 82 which processes or directs the processing of the ultrasound signals. Connected to the expansion bus 86 of the motherboard is a digital beamformer 90, which controls and receives ultrasound signals from a scanhead or transducer 10. The received scanlines produced by the beamformer 90 are stored in an r.f. memory, then processed by either the CPU, a digital signal processor (DSP) card 92, or both. The processed signals are then scan converted into the desired image format by the CPU and coupled to a video card 94 on the expansion bus which produces an image on a display 50. The ultrasound images may be sent to other processors, storage devices, or workstations which are networked with the ultrasound system by means of a network card 96 on the expansion bus. The user controls the ultrasound system through a user interface 62 which is coupled to the keyboard input of the motherboard 80. Ultrasound images and software programs can be stored on a disk drive 102 which is coupled to the motherboard by an SCSI bus 106, and images and reports may be printed on a printer 104 which is connected to a parallel bus 108.

The digital beamformer 90 may be operated as a baseband digital beamformer as shown in FIGS. 7a, 7b, 8 and 9. The steps performed by the beamformer are illustrated in the flowchart of FIG. 6. A constructed embodiment employs an I,Q sampling scheme as illustrated in U.S. Pat. No. 5,544, 655. In the constructed embodiment each element of the array transducer of the scanhead is coupled to a separate analog-to-digital (A/D) converter of the digital beamformer. The ultrasound signals of each transducer element are sampled at quadrature phases of a nominal transducer frequency, generally the center frequency of the transducer frequency response characteristic, as illustrated in step 40 of FIG. 6. For example, if a scanhead has a nominal 7.5 MHz center frequency, the signals of each transducer element would be sampled by an A/D converter operated at a 30 MHz sampling rate. Signals from a 5 MHz scanhead would be sampled at a 20 MHz sampling rate. One cycle of a 7.5 MHz wave 100 is shown above FIG. 7a, with sampling points I, Q, −I and −Q shown at quadrature points along the wave. The arrows of FIG. 7a represent the sampling times for such a wave sequence for a transducer element $e_1$. The sampling times for the first cycle of the wave are $I_{c1}$, $Q_{c1}$, $-I_{c1}$, and $-Q_{c1}$. Sampling continues at this rate, with the second cycle sampled as shown at times $I_{c2}$, $Q_{c2}$, $-I_{c2}$ and $-Q_{c2}$ and so forth.

FIG. 7b represents the sampling times for an element $e_n$ of the transducer array which is more distant from the scanline than element $e_1$. By virtue of the greater distance from the scanline, echoes from the scanline will begin arriving at element $e_n$ at a later time than they begin arriving at element $e_1$. Due to this, the sampling of signals from element $e_n$ is delayed with respect to the sampling of signals from element $e_1$, as shown by the offset position of the arrows of FIG. 7b with respect to the arrows of FIG. 7a. As is well known in the art, a linear variation in the start of sampling across the array will result in steering of the received beam, and a quadratic variation in the sampling times across the array will result in beam focusing. Changing the phase of the sampling time while echoes are received will dynamically focus the received beam.

The signal samples which are acquired from each element are bandpass filtered by separately combining consecutive I and Q samples, as indicated in step 42 of FIG. 6. For example, bandpass filtering may be performed by summing the two samples taken at times $I_{c1}$ and $-I_{c1}$ to produce a filtered I sample, and summing the two samples taken at times $Q_{c1}$ and $-Q_{c1}$ to produce a filtered Q sample. In a preferred embodiment, the desired bandwidth is produced by summing the I and Q samples from one cycle of the transducer frequency. In the example of FIGS. 7a and 7b, the samples taken at time $I_{c1}$ and $-I_{c1}$ are summed together with inversion of the negative sample value to produce a filtered I sample, and the samples taken at time $Q_{c1}$ and $-Q_{c1}$ are summed together to produce a filtered Q sample, also with inversion of the negative value. These filtered I and Q samples from the first two sampling cycles are stored in a memory 110 as the I,Q samples for range $r_1$ of transducer element $e_1$. The process then continues with the combining of the I and Q samples over the next sampling cycle which is advanced from the previous cycle by one-half cycle to form another filtered I,Q pair which is stored in memory 110 in the range $r_2$ location for element $e_1$. Samples are combined in one cycle groups over the full depth of the scanline, with the filtered I,Q pair from the greatest depth stored at the last range, $r_m$. Different filter characteristics may be obtained by separately combining the values of I and Q samples over sampling intervals greater than one sampling cycle, if desired.

The samples from other array elements are also filtered by separately combining consecutive I and Q samples from successive sampling cycles. The filtered I,Q pairs are likewise stored in correspondence with the ranges from which the samples were acquired. At the end of the process filtered I,Q samples from each element are arranged in the memory 110 in correspondence with the depths from which they were acquired. It will be appreciated that the number of elements used, and hence the number of I,Q pairs in the memory, will increase with depth if the aperture is expanded as a function of depth.

Preferably, memory 110 is organized with the filtered I,Q pairs from each element aligned in a common row or column of the memory. The I,Q pairs are also preferably organized in the orthogonal direction with samples aligned by common depth or range $r_n$. It is then only necessary to sum the samples along a common range row or column to form the coherent received echoes. In the example of FIG. 8, the I,Q samples in the first column are summed to form a coherent echo at range $r_1$ for the beam. The summed $I_1$ samples and the summed $Q_1$ samples are stored at the first range location $r_1$ for this received scanline, identified as line $R_1$ in the r.f. memory of FIG. 9. This $I_1,Q_1$ pair is thus stored at the intersection of addresses $R_1$ and $r_1$ in the r.f. memory 120. As the common range columns of memory 110 are summed for successive ranges of the received scanline, the summed $I_1,Q_1$ pairs are stored at their proper range $r_n$ locations in the $R_1$ column of the r.f. memory 120.

After the full depth of $I_1,Q_1$ sample pairs have been formed and stored for the first received scanline $R_1$, the transducer array transmits a second beam $T_2$ along an adjacent beam direction, and the signals received by each active transducer element for this second beam are sampled, bandpass filtered, and stored in the memory 110. Common range samples are again summed and stored in the second column of the r.f. memory 120, the column for the second received scanline $R_2$, as shown by step 44 in FIG. 6. The transmission and reception process continues in this manner to fill the r.f. memory with coherent $I_n,Q_n$ sample pairs for the full depth of each transmitted and received scanline $R_n$.

As the r.f. memory 120 fills up with received scanlines, the CPU 82 responds to the formation of a group of sixteen received scanlines by transferring the received scanlines in groups of sixteen to the DSP card 92. The DSP card interpolates a new set of scanlines, detects the echo data, and returns the detected scanline data to the CPU for scan conversion processing and display. The processing by the DSP is shown at step 46 in FIG. 6. This processing is performed as described in FIGS. 4a–4b. For example, the $I_n,Q_n$ pairs of FIG. 9 can be used to interpolate two intermediate lines by computing a first interpolated sample at range $r_1$ for a first interpolated line $L_1$ using the $I_1,Q_1$ samples and the $I_2,Q_2$ samples from the range $r_1$ in FIG. 9. The interpolated $I_{int}$ value is computed using the expression (¾$I_1$+¼$I_2$), and the interpolated $Q_{int}$ value is computed using the expression (¾ $Q_1$+¼$Q_2$). A detected interpolated echo value may then be formed by taking the square root of the sum of the I,Q squares by computing $(I_{int}^2+Q_{int}^2)^{1/2}$. This detected echo value at the first range, $E_{r1}$, of the interpolated scanline $L_1$ is stored in an R-θ memory 130, shown in FIG. 10, in the first row under the column headed $L_1$.

The same $I_n,Q_n$ samples of FIG. 9 are similarly weighted to compute I,Q values for a second interpolated line, $L_2$, at range $r_1$ using the expressions $I_{int}$=(¼$I_1$+¾$I_2$), and $Q_{int}$=(¼$Q_1$+¾$Q_2$). A detected echo $E_{r1}$ at range $r_1$ is then computed using the interpolated $I_{int}$ and $Q_{int}$ values in the expression $(I_{int}^2+Q_{int}^2)^{1/2}$. This detected echo value, $E_{r1}$, at the first range of the second interpolated line $L_2$ is stored at the top of the second column of the R-θ memory 130 under the address heading $L_2$.

Figure 10:
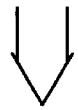

The $I_n,Q_n$ data of the first and second received scanlines $R_1,R_2$ for increasing ranges is likewise used to interpolate $I_{int}$ and $Q_{int}$ values for the $L_1$ and $L_2$ lines at increasing depths through the maximum depth $r_m$. Echoes are detected for the two lines at each range and stored in the R-θ memory 130 as FIG. 10 shows. Then, the DSP continues to interpolate the data values of the next two lines, $L_3$ and $L_4$, using the $I_n$ and $Q_n$ samples of the received scanlines $R_2$ and $R_3$. It will be seen that some of the products used in the computation of the lines $L_1$ and $L_2$ may be saved and used in the computation of lines $L_3$ and $L_4$, namely, the fractional weightings of the $I_2$ and $Q_2$ samples of received line $R_2$. Thus, these fractional weightings are saved for the computation of the $L_3$ and $L_4$ interpolated lines so that they do not need to be recomputed a second time.

The data of the first sixteen received scanlines $R_1$–$R_{16}$ is used in this manner to compute thirty interpolated and, if desired, detected lines, $L_1$–$L_{30}$. The data of the last received scanline, $R_{16}$, is saved in the DSP and used with the data of the first scanline, $R_{17}$, of the next group of scanlines which are sent to the DSP from the r.f. memory 120. Thus, the data of scanlines $R_{16}$ and $R_{17}$ is used to compute the next two interpolated lines, $L_{31}$ and $L_{32}$. The data of the next sixteen scanlines, $R_{17}$–$R_{32}$, is used in the same manner as that of the first group of sixteen scanlines to interpolate and detect another group of interpolated lines for the R-θ memory 130. When a full image frame of interpolated lines has been formed, the lines may be scan converted and displayed, with double the line density of an image which could have been formed with the received scanline data.

It will be appreciated that the number of image lines can be redoubled by interpolating a second level of interpolated lines from the first set, as shown in FIG. 11 and by the process steps 72–76 of FIG. 6. The transmitted beams are locationally depicted by the arrows $T_0$, $T_1$, $T_2$, $T_3$, and $T_4$ in the first row at the top of FIG. 11. In response to these transmitted beams the received scanlines $R_0$, $R_1$, $R_2$, $R_3$, and $R_4$ are produced by the beamformer 90 in FIG. 5. A first level of double density interpolated lines is produced from the received scanline data as shown by the row of interpolated lines $R_Z$, $R_A$, $R_B$, $R_C$, $R_D$ and $R_E$. This first level of interpolated lines is computed as describe above and as indicated by step 72 in FIG. 6. Then, a subsequent level of interpolated lines is computed using the interpolated lines of the first level of interpolation and the weights of ¼ and ¾, as indicated by step 74 in FIG. 6. For instance, interpolated lines $R_a$ and $R_b$ are interpolated from the data of interpolated lines $R_A$ and $R_B$. Interpolated lines $R_c$ and $R_d$ are produced from the data of interpolated lines $R_B$ and $R_C$, and interpolated lines $R_e$ and $R_f$ are produced from the data of interpolated lines $R_C$ and $R_D$. Only the second level of interpolated lines is used to form an image; the first level of interpolated lines are discarded. While an image formed of the second level of interpolated lines will generally be acceptable, it will not be completely free of the varying interpolation artifact, as the power spectra of the coefficients used to interpolate all of the lines are not matched. Rather, the power spectra of the interpolation coefficients used to generate adjacent pairs of lines of the second level of interpolation will be matched. For instance, the power spectra of the coefficients used to interpolate lines $R_a$ and $R_b$ will be matched, the power spectra of the coefficients used to interpolate lines $R_c$ and $R_d$ will be matched, and so forth.

Alternatively, the second level of interpolated lines can be produced directly from the received scanline data, without the use of or need to produce the first level of interpolated lines, by a four phase filter having coefficients of (1/16, ¾, 3/16, 0), (0, ⅝, ⅜, 0), (0, ⅜, ⅝, 0), and (0, 3/16, ¾, 1/16).

Finally, it is possible to interpolate new image lines, detect the echo data, and scan convert the echo lines in one processing step. As is well known, scan conversion involves the relocation of the received echo data to display values known as pixels which are arranged in an x-y coordinate system corresponding to the raster lines of the display device. Since the raster line density is often far greater than the received scanline density, a far greater density of video line data is generated by a process conventionally known as "hole filling," by which the voids between the received echoes are filled in with calculated or interpolated pixel values.

A common technique for performing the coordinate transformation from R-θ coordinates to x-y coordinates and to fill in voids in the image is known as four point interpolation. By this technique, every display pixel located between four received echoes is filled in by a weighted value of the four surrounding echoes, weighted in accordance with the proximity of the four echoes to the pixel location. A scan converter which operates in this manner is described in U.S. Pat. No. 4,581,636, for example.

The present inventors have discovered that it is not necessary to perform such computationally intensive scan conversion, but that only a grid of values approximating pixel values need be computed and used in the displayed image. For instance, FIG. 12 illustrates two received R-θ scanlines, $θ_1$ and $θ_2$, each with two received data points shown as large circles in the drawings. The data points on scanline $θ_1$ are $I_1,Q_1$ and $I_2,Q_2$, and the data points on scanline $θ_2$ are $I_3,Q_3$ and $I_4,Q_4$. A sequence of vertical lines, ones of which are denoted v2, v3, v4, . . . v7 are shown to represent the x-y coordinates of the display pixels, which are shown as small circles on the vertical lines. As is evident, the pixel density exceeds the density of the received scanlines and echo data. The conventional approach to computing the values of all of the pixels between the illustrated scanlines would be to use the four data points on the scanlines in the computation of each pixel value. However, the present inventors have found it to be sufficient to use the four data points to compute a grid of sixteen detected echo values $E_1$–$E_{16}$ in R-θ space as depicted by the hexagons between the four data points. The sixteen detected echo values are computed using the hole filling technique of the prior art, as if sixteen evenly distributed voids were being filled between the received data points. Instead of computing a distinct value for each pixel in the x-y video line sequence, each pixel simply uses the value of the nearest computed echo, rather than a uniquely separate value. For example, the pixel within the dashed circle 152 is closest in proximity to echo $E_1$, and the value of echo $E_1$ is used for the value of this pixel. Similarly, the pixels within the dashed circle 154 are closest to echo $E_2$ and would use this echo value. Likewise, the pixels within the dashed circle 150 are closest to echo $E_5$ and would use this echo value, and the pixels within the dashed circle 156 are closest to echo $E_{13}$ and would use this echo value for their pixel values. It has been found that the use of the grid of echo values is sufficient to produce an image of high resolution for the user, with the greatest precision occurring when the number of echo values and pixel are approximately equal. If the user subsequently desires to enlarge, or "zoom" to a section of the image, a further grid of echo values can be computed for only the enlarged or zoomed region of the initial image. If the initial image in a given embodiment of the present invention should appear patchy or blocky, a larger grid of echoes such as thirty-two by thirty-two can be computed and used for the values of the pixels in closest proximity to them. This technique of using proximity values for the pixel values affords a tremendous ease in computational complexity as compared with exact computation of each separate display pixel, a significant advantage for a p.c.-based, software-intensive ultrasonic imaging system. In a constructed embodiment, the grid of echo values is computed from the scanline data points in a sequence of digital shift and add operations, rather than the multiplication operations that the conventional technique requires. As step 70 of FIG. 6 shows, it is possible in an embodiment of the present invention for the processor to simultaneously interpolate a higher level of interpolated scanlines, detect the echo data, and produce scan converted data values suitable for an x-y raster display, all in a single processing step.

What is claimed is:

1. A method for interpolating two or more lines of ultrasonic display information from two received ultrasonic scanlines comprising the steps of:

a. receiving a first scanline at a first scanline location;
   b. receiving a second scanline at a second scanline location;
   c. interpolating first and second lines of ultrasonic display information at third and fourth line locations which are between said first and second scanline locations, each of said first and second lines containing components of said first and second scanlines in proportion to the spacing of the line from said first and second scanline locations;
   d. detecting said first and second lines of ultrasonic display information; and
   e. producing an image using said first and second lines of ultrasonic display information.

2. The method of claim 1, wherein step c comprises weighting samples from said first and second scanlines in proportion to the spacing of the lines from said first and second scanline locations, and combining said weighted samples to form samples of said first and second lines.

3. The method of claim 2, wherein said weights are ¾ and ¼, and each line is located one-quarter of the distance between one scanline and the next scanline.

4. An ultrasonic diagnostic imaging system which produces images using interpolated line information comprising:

an ultrasonic array probe;
   a beamformer which receives echo data from said ultrasonic array probe and produces first and second scanlines in response to first and second ultrasonic transmissions;
   an interpolator which interpolates first and second lines of ultrasonic display information at third and fourth line locations which are between said first and second scanline locations, each of said first and second lines containing components of said first and second scanlines in proportion to the spacing of the line from said first and second scanline locations;
   a detector which detects said first and second lines of ultrasonic display information; and
   a display for producing an image using said first and second lines of ultrasonic display information.

5. The ultrasonic diagnostic imaging system of claim 4, wherein said third and fourth locations are located one-quarter and three-quarters of the distance between said first and second scanlines, respectively.

6. The ultrasonic diagnostic imaging system of claim 5, wherein said interpolator includes means for weighting samples of said first and second scanlines by ¾ and ¼, and summing the weighted samples to form said first line, and means for weighting samples of said first and second scanlines by ¼ and ¾ and summing the weighted samples to form said second line.

7. An ultrasonic diagnostic imaging system comprising:
   an ultrasonic transducer having a nominal frequency;
   an A/D converter for sampling ultrasonic signals received by said transducer at quadrature phases of said nominal frequency;
   a bandpass filter for filtering said sampled ultrasonic signals by combining successive phase-related samples of said ultrasonic signals; and
   a processor for processing said filtered signal samples; and
   a display for displaying an image formed from said filtered signal samples.

8. The ultrasonic diagnostic imaging system of claim 7, wherein said A/D converter comprises means for sampling said ultrasonic signals at alternating I and Q phases of said nominal frequency, and said bandpass filter comprises means for separately combining I samples and Q samples.

9. The ultrasonic diagnostic imaging system of claim 8, wherein said bandpass filter includes means for combining successive phase-related samples of said ultrasonic signals over one cycle of said nominal frequency.

10. The ultrasonic diagnostic imaging system of claim 8, wherein said bandpass filter includes means for combining successive phase-related samples of said ultrasonic signals over successive one cycle intervals of said nominal frequency in one-half cycle increments.

11. An ultrasonic diagnostic imaging system including a beamformer which produces a plurality of image lines of R-θ coordinates, and a scan converter comprising:

means for computing a plurality of image values between said R-θ image lines which are based on the relative position of said image values from said R-θ image lines; and
   a pixel data memory which stores display pixel values having orthogonal coordinates, wherein said display pixel values exhibit the values of image values having coordinates nearest to the coordinates of said display pixels.

12. A method for interpolating ultrasonic display information from received ultrasonic scanlines comprising the steps of:

a. receiving ultrasonic scanlines at a plurality of scanline locations;
   b. using said received scanlines to generate a first set of interpolated scanlines;
   c. using said first set of interpolated scanlines to generate a second set of interpolated scanlines; and
   d. producing an image from said second set of interpolated scanlines to the exclusion of said received scanlines and said first set of interpolated scanlines.

13. A method for interpolating ultrasonic display information from received ultrasonic scanlines comprising the steps of:

a. receiving ultrasonic scanlines at a plurality of scanline locations;
   b. using said received scanlines to generate a plurality of interpolated scanlines by means of interpolation coefficients exhibiting matched power spectra; and
   c. forming an image from interpolated scanlines generated by means of interpolation coefficients exhibiting matched power spectra.

14. The method of claim 13, wherein step b further comprises generating interpolated scanlines at spatial locations of ¼ and ¾ of the distance between adjacent received scanlines.

15. A method for interpolating ultrasonic display information from received ultrasonic scanlines comprising the steps of:

a. receiving ultrasonic scanlines at a plurality of scanline locations;
   b. filtering adjacent ones of said received scanlines to generate four interpolated scanlines at spatial locations which are 1/8, 3/8, 5/8 and 7/8 of the distance between said adjacent received scanlines; and c. producing an image from said interpolated scanlines.

16. The method of claim 15, wherein step b comprises filtering adjacent ones of said received scanlines with a four phase filter.

17. The method of claim 16, wherein step b further comprises filtering adjacent ones of said received scanlines with a filter of at least four taps.

18. The method of claim 16, wherein step b further comprises using a filter having coefficients of (1/16, 3/4, 3/16, 0), (0, 5/8, 3/8, 0), (0, 3/8, 5/8, 0), and (0, 3/16, 3/4, 1/16).

19. The method of claim 15, wherein step b further comprises generating pairs of interpolated scanlines utilizing interpolation coefficients with matched power spectra.

* * * * *